March 24, 1970    G. J. CROCKER    3,502,497
PRESSURE-SENSITIVE ADHESIVE PRODUCT
Filed Aug. 31, 1967    2 Sheets-Sheet 1

INVENTOR.
GUY J. CROCKER
BY Charles C. Harris
ATTORNEY

March 24, 1970  G. J. CROCKER  3,502,497
PRESSURE-SENSITIVE ADHESIVE PRODUCT
Filed Aug. 31, 1967  2 Sheets-Sheet 2

INVENTOR
GUY J. CROCKER
BY
ATTORNEY

United States Patent Office 3,502,497
Patented Mar. 24, 1970

3,502,497
PRESSURE-SENSITIVE ADHESIVE PRODUCT
Guy J. Crocker, North Brunswick, N.J., assignor to Johnson & Johnson, a corporation of New Jersey
Continuation-in-part of applications Ser. No. 392,197, and Ser. No. 392,219, both Aug. 26, 1964. This application Aug. 31, 1967, Ser. No. 678,467
Int. Cl. C09j 7/00; B44d 1/14
U.S. Cl. 117—68.5
22 Claims

ABSTRACT OF THE DISCLOSURE

Normally tacky pressure-sensitive sheets and tapes having a release coating comprising a release agent copolymer of stearyl methacrylate and acrylonitrile in proportions ranging from about 50 parts by weight of stearyl methacrylate and 50 parts by weight of acrylonitrile to about 80 parts by weight of stearyl methacrylate and 20 parts by weight of acrylonitrile, applied to or coated on the surface of the sheet or tape opposite to that of the adhesive. The same release coating also may be applied to the surface of a separate liner or release sheet to be placed in contact with a normally tacky pressure-sensitive adhesive surface. The release agent may be applied directly to a nonporous backing sheet or on a porous sheet which has been precoated, or it may be mixed into a backsize or release coating when a film former is needed for any reason or when it is desired to modify the release agent or other surface properties of the backing, or the like.

---

The present invention relates to normally tacky and pressure-sensitive sheets and tapes, more particularly to such tapes which comprise a layer of a pressure-sensitive adhesive coated on one side of a thin, flexible backing material, such as a substantially nonporous backing film or sheet of cellulose acetate, regenerated cellulose, polyethylene terephthalate, coated paper, etc., or a porous material such as creped paper or the like.

This application is a continuation-in-part of my copending applications Ser. No. 392,197 and 392,219, filed Aug. 26, 1964 and both now abandoned.

Pressure-sensitive adhesive tapes are generally manufactured and sold with the tape wound upon itself in convolutions to form a roll. Consequently, when it is necessary to use the tape, it must be possible to unwind the desired length from the roll without excessive force or without delamination of the backing, offsetting of the adhesive, or the like, regardless of the time or conditions under which the tape had remained in roll form prior to use.

For these reasons, a coating known as a release coat is required on the back surface of the tape for the purpose of controlling the force required to unwind the roll. In the tape roll the adhesive of one layer of tape comes into direct contact with the back surface of the next layer down in the roll. Without the release coat on the back surface the adhesive would come into direct contact with the backing, and the natures of the backing and adhesive are generally such that an excessively strong adhesive bond would eventually develop between them and an excessive amount of force would be required to unwind the roll. This is particularly true of paper masking tapes, the backings of which consist of a porous creped paper impregnated with a rubbery composition to bond together the paper fibers. In such a tape, the rubber in the pressure-sensitive adhesive and the rubber in the backing flow together rather quickly as the tape roll ages, if no release coat is present, and the force required to unwind the roll is so great that it generally results in splitting of the paper backing, rendering the tape useless.

The first prior are expedient to prevent development of an excessively strong bond between the adhesive and the impregnated paper backing in paper backed tapes was the use of a varnish coat, or backsize, on the back surface of the backing. For example, Drew in U.S. Patent 2,269,-712 cites the use of shellac, glue and cellulose derivatives such as nitrocellulose as useful backsize coatings for paper masking tapes. Such coatings function primarily as a barrier layer to prevent contact between the rubber of the adhesive and the rubber of the backing. They are quite successful in doing this, but they are not release coats in any true sense. Any aggresively tacky pressure-sensitive adhesive adheres quite tenaciously to such coatings, and although tape rolls including such coatings can be unwound more readily than tape rolls without backsize, still the force required for unwinding is excessive. Delamination of the backing still occurs frequently, and even when the backing does not split it is often considerably distorted by the high forces acting on the stretchy creped paper.

To still further reduce the force required to unwind tape rolls release coats were introduced; that is, coats on the back surface of tapes to which the pressure-sensitive adhesives used have very low specific adhesion. Several classes of release materials have been used in such coatings. Wax is used in the coating of Humphner U.S. Patent 2,032,845. Various soaps and other surface active agents have been used, as in for example Schieman U.S. Patent 2,358,831. Materials which will polymerize after coating, such as a Werner chrome complex of stearic acid, have been used, as in Martin et al. U.S. Patent 2,803,557. Many polymers having release properties have also been suggested, for example, copolymers of octadecyl acrylate-acrylic acid as in Hendricks U.S. Patent 2,607,-711. Silicone polymers have also been used, as in Dickard U.S. Patent 2,985,554.

Paper masking tapes in general require a fairly heavy backsize coat, of the order of 0.1 to 1.0 ounce per square yard, in order to adequately seal the porous paper surface and fill the rugosites of the creped backing to give a smooth glossy surface. Materials having release properties are generally too low in cohesive strength, too brittle or otherwise too deficient in physical properties, to be applicable in films as heavy as above specified. Release agents then must be applied to porous backing sheets by either of two methods. One method is to apply a backsize coat to fill and smooth the paper surface, and then to apply an extremely thin coat of the release material (usually less than 0.01 ounce per square yard) over this base coat of backsize, as in Hendricks U.S. Patent 2,607,711. The other method is to mix the release agent in with the backsize polymer to form a release backsize which is applied at a weight of from 0.1 to 1.0 ounce per square yard and performs the double function of sealing and smoothing the paper backing while at the same time providing release properties. An example of the latter method is Holtz U.S. Patent 2,914,167.

All of the prior art release materials and release coatings suffer from one or more, usually many, defects. The specific release agent of the present invention, applied in the backsize compositions of this invention, overcomes all of these difficulty to a truly amazing degree.

The greatest defect of prior art release coats has been the loss of release properties on aging. A roll of tape formulated to unwind initially with a force of perhaps twenty ounces per inch of width at 150 feet per minute unwinding speed may develop an unwind force of 75 or even 100 ounces per inch or over after long aging. This is especially prevalent when the tape rolls are stored at higher temperatures such as may be encountered near the roofs of some warehouses during the summer months, especially in the southern areas of the United States and other hot and humid climates.

The second great defect of prior art release coats is their interaction with the adhesive to cause loss of adhesiveness or loss of tackiness. This may occur immediately on contact between the release coat and the adhesive, or only after long aging. Again, aging at elevated temperatures usually aggravates this condition. With many prior art release agents an adhesive formulated to have an adhesion to stainless steel of 35 ounces per inch width initially may show an adhesion of only 25 ounces after contacting the release coat, and in some cases the adhesion may even drop to zero.

A third defect of prior art release coats shows up when tapes are used in a "shingling" application. This is an application involving use of a strip of tape adhered to the back surface of another strip of tape. For example, in automotive spray paint masking one piece of tape is applied to the car to outline the edge of the area to be sprayed, and a second piece of tape is used to attach a large sheet of masking paper to the first piece of tape. To perform successfully, the adhesive must adhere tenaciously to the release coat to support the weight of the masking paper through subsequent spray painting and through high temperature drying ovens. This, of course, is contradictory to the requirement of easy roll unwinding. Thus, there is a general tendency for release coats that give good unwind properties to give poor "shingling" properties, and vice versa. This, fortunately, is not always true, however. Failure in a "shingling" application is a relatively slow sliding at a low peel angle, while unwinding from a roll is very rapid and at a 90 degree angle. Adhesion is greatly affected by both peel angle and peeling speed, and the effects of speed and angle are quite different for different adhesives and for different release coats. It happens that with the release coat of this invention, with a variety of adhesives, these effects are favorable to obtaining an unexpectedly good combination of "shingling" ability and easy unwind.

A fourth defect of some prior art release backsizes is in poor adherence of dried paint films to the back surface of the masking tape. After the paint is dry, the tape is stripped off. If the dried paint has poor adherence to the tape it will crack and flake off and small pieces may fall onto areas of paint which are still slightly tacky, marring the finish. This is especially likely to occur with release coats which give easy unwind and especially with those that have good retention of easy unwind on aging, since if adhesives adhere poorly to the coating it is only to be expected that paints will adhere poorly to the coating. The release coats of this invention, however, in spite of their excellent unwinding and aging characteristics, have entirely adequate adherence for paint films.

Another defect of many prior art release materials is that the amount applied must be very carefully controlled at a precise level in order to obtain the desired level of unwind. This is particularly true of release materials such as stearato chromic chloride and silicones. If an application weight target is chosen to give the desired ease of unwind, normal variations inherent in production coating conditions will insure that a small fraction of the tape produced will have too hard unwind, and other fraction will have too easy unwind, practically falling off the roll, a condition that leads to trouble on automatic dispensing equipment, resulting in overshoot, wrap-arounds and tangles. The release agent as used in the practice of the present invention is very insensitive to such variations, insuring a consistent quality of product.

Still a further disadvantage of most prior art release agents is that they are too specific in their action. While one may give good results against a particular adhesive, it may be quite worthless against an adhesive of a different type. The release agent used in the practice of the present invention, on the other hand, has demonstrated its usefulness against every one of the many adhesives of varied type with which it has been tried.

In the present invention, the release agent may be coated directly on a nonporous backing sheet or on a porous sheet which has been precoated, or it may be mixed into a backsize or release coating when a film former is needed for any reason or when it is desired to modify the release agent or other surface properties of the backing, or the like. When the release agent is mixed into the backsize coating, it is theorized that the release agent blushes or blooms to the back surface of the backsize in the course of drying, thus forming, in effect, a double coating with only one coating operation. It will be realized by those familiar with blushing and blooming phenomena that this is ordinarily a very difficult process to control. For this reason, prior art release backsizes applied by this method have given much more variation in release and compatibility between the release agent and the other materials in the backsize. Variations in solvent composition, variations in absorbency of the paper to which the coating is being applied, variations in drying temperatures and oven air velocities, all normally exert a disproportionately great effect on the blooming of the release agent and, therefore, on those properties of the finished tape which depend on this. The practice of the present invention is found to be free from these difficulties to an extraordinary degree.

A further difficulty with tapes incorporating the release agent in the backsize is that relatively great amounts of the release agents must be used. Thus, most polymeric release agents must be used at levels of from 5 to 20 percent of the total backsize in order to obtain adequate unwind properties. Since most such release agents are the most expensive ingredients in the tape, this leads to a substantial cost. Also, the unwind properties are quite sensitive to the percentage of release agent used in the composition. With the present invention, however, although 5 to 20 percent of the release agent may be used if desired, just as good results may often be obtained with as little as 1 percent. This not only provides economy, but gives a substantial safety factor and minimizes the effects of any possible mixing errors.

I have invented a pressure-sensitive adhesive tape which overcomes all of these disadvantages of prior art tapes of this type. According to my invention, a release coating or layer of release coating composition is contemplated which provides the following unexpected combination of properties.

(1) Controlled unwind of the tape roll, i.e., neither too hard nor too easy with improved consistency of unwind.

(2) Retention of these properties over long storage periods at various conditions of temperature and humidity.

(3) Minimum tendency to decrease the tackiness of the pressure-sensitive adhesive layer of the tape.

(4) Good "shingling" characteristics.

(5) Good adherence to paint films applied to the release coat.

(6) Economy in the use of release agent, when incorporated in a release coating composition, since all of the above properties may be attained with very small quantities of release agent in the release coat.

(7) Low sensitivity to variations in the amount of release agent in the release coat, as well as other manufacturing variations.

(8) High flexibility in the choice of the pressure-sensitive adhesive which may be used and still provide all of the above properties in the tape of this invention.

The difficulties in obtaining these objectives, many of which are at least to some extent contradictory, cannot be overemphasized. Pressure-sensitive adhesives necessarily are semi-liquid in nature. This is necessary to achieve adherence with little or no application pressure. They are blends of many materials and are heterogeneous in their phase structure, especially at the surface contacting the release coat. They are coated on a backing which may comprise a heterogeneous mixture of fibers, elastomer and other materials. For instance, a paper masking tape may easily include 20 to 30 separate ingredients in its 6 or 8 mils of thickness, each with a definite purpose and place. Due to the semi-liquid character of the main part of the structure, it follows that diffusion and migration from place to place occur during storage of tape over extended periods. Recent work has shown for example that in certain masking tapes as much as 0.25 ounce per square yard of material may diffuse through the release coat in the course of a few months aging. In the midst of all this flux, to maintain the tape properties stable is a formidable task, and one in which the release has always been the weakest link. The job of a release agent film, perhaps weighing as little as .001 ounce per square yard, only a few molecules thick, in maintaining its film integrity and even its surface orientation while subjected to a heterogeneous semi-liquid adhesive or the passage of 250 times its own weight of sticky resin is obviously an extremely difficult one.

It is equally obvious that the development of release backsizes of the type contemplated by the present invention is not conducive to scientific prediction. The conclusion that a low energy surface is required for easy release is about as far as science has been able to take us. The answer, a tape possessing the desired release properties under a multitude of conditions, as well as economy and all of the other characteristics required for a successful product, can only be found empirically.

The normally tacky pressure-sensitive adhesive tape according to my invention comprises a flexible backing film or sheet, a layer of normally tacky and pressure-sensitive adhesive on one side of the backing, and a release coating on the other side of the backing. The release coating comprises a release agent copolymer consisting essentially of stearyl methacrylate and acrylonitrile in proportions ranging from about 50 parts by weight of stearyl methacrylate and 50 parts by weight of acrylonitrile to about 80 parts by weight of stearyl methacrylate and 20 parts by weight of acrylonitrile; preferably from about 50 parts by weight of stearyl methacrylate and 50 parts by weight of acrylonitrile to about 60 parts by weight of stearyl methacrylate and 40 parts by weight of acrylonitrile. If the copolymer contains less than about 20 parts of acrylonitrile, the advantages of this invention are not realized. When the term stearyl methacrylate is used in this application, it means octadecyl methacrylate, or alkyl methacrylates having at least 12 carbon atoms and consisting predominantly of octadecyl methacrylate.

The release coating composition may consist of a solution of the release agent copolymer, itself, when it is to be applied to a substantially nonporous film or sheet, or the release agent may be mixed with some other material, such as a film former, to improve its adherence to the backing or otherwise enhance the properties of the coated sheet.

When the backing is porous or rough, or when it is desired to modify the back surface properties of the coated sheet by coating the backing with a substantially continuous film of another material, the release coating composition preferably comprises a minor proportion of the release agent mixed with a major proportion of a film former, or film forming composition, which is generally incompatible with the release agent copolymer in the dry state of the release coating composition formed thereby but sufficiently compatible therewith in solution to allow the release coating composition to be coated on the backing without gross separation of the release agent from the film former during coating. The degree of compatibility or incompatibility may vary to some extent depending upon the desired application for the tape or sheet or the purpose for which the film forming composition is used. However, the incompatibility of the film former in this case, with respect to the release agent, must be such that the release agent blooms to the back or outer surface of the release coating to provide effective release at this surface, as described hereinbefore. For this purpose, the release agent copolymer should be one having a methanol insoluble fraction possessing a number average molecular weight between about 1,000 and 25,000, preferably between about 2,000 and 12,000.

In this incompatible release agent-film former system, 1 part of release agent to 100 parts of the film forming composition, on a solid basis, or approximately 1 percent of the release coating composition, generally is enough to produce a very substantial degree of release, and 2 or 3 percent normally will produce the full effect. Greater amounts may be employed, and generally are, as a safety factor, since very considerable excesses over what is actually required product no great deleterious effect. This is in direct contrast to the action of all other known release agents, which give an increasing release effect as the proportion of release agent is increased over a very broad range of release agent concentrations, and which exhibit a continuously increasing tendency to detackify adhesives which contact them as their concentration is increased.

The upper concentration of release agent copolymer in this type of release coating composition is limited by other considerations. First, it should be noted that the pure release copolymer of this invention is not suitable for use as a coating on paper tapes by applying the release agent separately over certain film formers to which it does not adhere. When this is done over a curable alkyl film forming composition, for example, complete detackification of adhesives contacting the release agent film results, due to a lack of adhesion between the release agent and the alkyd. Thus, it is necessary for the release agent to be used mixed with any film forming composition to which it will not adhere. Secondly, the incompatibility between the release agent and the film former in the dry form, which is necessary for its proper functioning, also shows up to some degree in solution prior to coating. This depends to a considerable degree on the solvent used and on the percent solids required for the particular coating method employed. Using up to 10 percent release agent on the solids basis and up to 30 percent solids with such solvents as toluene, usually no difficulty will be encountered with incompatibility in solution. With higher release agent contents, higher solids, or a proportion of aliphatic solvents, there may be an increasing tendency for the constituents of the release coating composition to separate. This may require such expedients as continuous stirring at the coating machine. Generally from at least about 1 percent to about 25 percent by weight release agent with respect to the dry release coating composition is considered the most practical useful range for an incompatible system of the type described above, with 2 percent to 10 percent being preferred for normal usage. However, higher concentrations of release agent may be used in this system under some circumstances.

In practicing this invention to coat porous paper backings, the film forming composition is chosen with four criteria in view: First, it must have suitable physical properties in the form of films of the thickness required to adequately coat and seal fibrous tape backings, that is, at from about 0.05 to 1.0 ounce per square yard dry coating weight. For example, it should have a desirable range of stiffness and should be tough and show no tendency to crack or powder when the tape is flexed sharply. Second, coatings of this film former must adhere strongly to the backings used. As indicated hereinbefore, the third and fourth requirements are that the release agent used must be incompatible with the film former after drying at very low levels of release agent, and that it must be possible to formulate a coatable composition with the release agent, that is, the release agent and the film former must be sufficiently compatible in solution form to be coatable without gross separation. The first two of these conditions can be met by any of a large number of resins and polymers normally used in coatings technology. The third and fourth are much more difficult to meet. Preferred film forming materials which are completely satisfactory in all respects for porous paper backings are certain curable film forming compositions based primarily on alkyd resins. These curable compositions include in addition to the alkyd resin a formaldehyde resin condensate, preferably an alcoholated urea-formaldehyde or melamine-formaldehyde, as commonly used in formulating baking alkyd finishes. The proportion of formaldehyde resin to alkyd resin is not especially critical, and may be adjusted within a relatively wide range to achieve the most desirable product. The speed of curing will increase with increasing formaldehyde resin content, so if only relatively low oven temperatures or short ovens are available, a higher content of the formaldehyde resin component may be desirable. On the other hand, higher formaldehyde resin content leads to increased stiffness and eventually to brittleness, so if a relatively thick backsize coat is required it may be necessary to reduce the formaldehyde resin content. Ordinarily, a ratio of about 75 parts of alkyd resin to 25 parts of formaldehyde resin is used, but this has been varied between 90 to 10 and 50 to 50, respectively, with no difficulty.

The release coating composition also may include catalysts for curing the film former, for example, an alkyl acid phosphate which may be used in an amount of about 10 percent by weight of the urea-formaldehyde or melamine-formaldehyde resin solids, if faster curing is required. Pigments or coloring agents may also be present.

Other film formers which are satisfactory for forming release coatings according to this invention include soluble polyesters derived from ethylene glycol and terephthalic acid, certain soluble polyacrylates including copolymers and terpolymers with styrene and other materials, soluble hydroxyl modified polyvinyl acetates, polyvinyl chloride plastisols, and other viscous and flexible film formers which possess the properties necessary to produce a release coating composition of this invention. These film formers may be used to coat paper or modify surface characteristics and still provide excellent release in the incompatible release agent-film former system described hereinbefore, or small quantities of these materials may be added to the release agent to assure that the resulting release coating composition will adhere to backing films or sheets which otherwise would not have sufficient adherence with the release agent of this invention.

The release coating may be applied to a nonporous backing directly from a solution of the release agent copolymer by a print roll technique, by knife coating for heavier applications, or by any other technique capable of applying the release material at the desired coating weight. In general, release coatings weighing from about 0.001 to about 0.02 ounce per square yard (on a dry basis) give excellent results when the release agent is applied directly to the backing according to this invention. When the release agent is mixed with a film former in the release coating composition, and the release coating or backsize is applied to a nonporous backing, such as a plastic film or a precoated paper, the coating may fall within this general weight range, or it may be made considerably heavier if it is desired to impart particular physical properties to the backing through the material of the film former. This is true whether or not the release agent and the film former are compatible or incompatible with respect to one another in the dry backsize coating.

When the release agent is applied to a porous backing in an incompatible release agent-film former system of the type described hereinbefore, the weight of the release coating also may vary over a rather broad range, depending on many factors. If a high degree of gloss is required for the finished tape, a somewhat heavy coating may be used. If a paper backing has a very heavy or rough crepe, a thicker backsize coating may be required to attain proper coverage and gloss. If a film or a flat paper is used, a much lighter coat will be needed. If the paper backing is heavily impregnated, less release coating composition will be required to fully seal the surface. However, if the back of an impregnated paper has been previously sealed with a first coat of a sealing backsize, only a very minimum weight of the release coating composition of this invention need be applied. The stiffness and body of the finished tape may also be adjusted somewhat by proper variation of the backsize weight. As indicated hereinbefore, film former based release coating compositions of this type ranging from about 0.05 to 1.0 ounce per square yard have been found entirely successful for application to porous backings, for example, with optimum coating weight depending upon the particular circumstances outlined above. This type of release coating layer may be applied from solution by any known method, for example, clearance coating, knife coating or air knife coating.

After coating, the solvents are removed from the release coating by air drying, by passage through a circulating air oven, by passage over steam heated cans, or the like. The choice of percent solids and of solvent type depends largely on the coating method and drying equipment available. Among useful solvents may be mentioned aromatic hydrocarbons, ketones and esters, and the solvent may include a proportion of aliphatic or naphthenic hydrocarbon solvent. In general, the solvent used, the percent solids, the coating method and the drying conditions have no critical effect on the fundamental properties of the finished tape, provided always that adequate backsize coverage and drying is achieved.

After applying and drying the coating, the backsize coating is cured or fused if necessary or desired. This may be accomplished in a last zone of the drying oven in the same pass used for coating and drying, or may be handled as a separate operation if desired. The temperature and time required will depend upon a number of factors. For instance, for the alkyd film former mentioned hereinbefore, they will depend on the proportion of alkyd to formaldehyde resin, on whether or not a catalyst is used, and on the type and amount of catalyst. The only criterion for a proper cure is development of insolubility in the backsize film. Provided insolubility is obtained, the degree of cure may vary widely without affecting the release and tack retention properties of the finished tape. Fifteen seconds at 325° F., for example, is satisfactory for most of the alkyd film forming compositions of this invention.

Other advantages of the invention will appear to one skilled in the art from the following description, examples and claims taken together with the drawings wherein:

Figure 1:
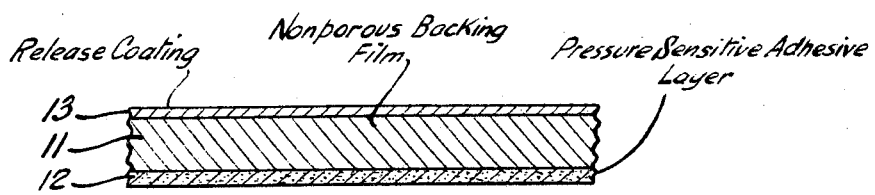
FIG. 1 is a schematic sectional view of a pressure-sensitive adhesive tape according to one embodiment of the invention.

Referring to FIG. 1 of the drawings, there is shown a pressure-sensitive adhesive tape according to one embodiment of this invention which comprises a thin, flexible and substantially nonporous backing film 11, a pressure-sensitive adhesive layer 12 on one side of the backing, and a release coating 13 on the other side of the backing. This tape is adapted to be wound upon itself to form a roll with the pressure-sensitive adhesive layer 12 down, or facing inwardly, in such a way that the underside of the adhesive layer 12 in each convolution of the roll is in intimate contact with the top surface of the release coating 13. As described hereinbefore, when the tape is unwound, the adhesive layer separates easily from the release coating without the necessity for applying excessive force and without any offsetting of the adhesive on the release coating. A conventional primer coating, not shown, may be applied between the backing and the adhesive layer 12 to assure that the adhesive layer adheres firmly to the backing.

Figure 2:
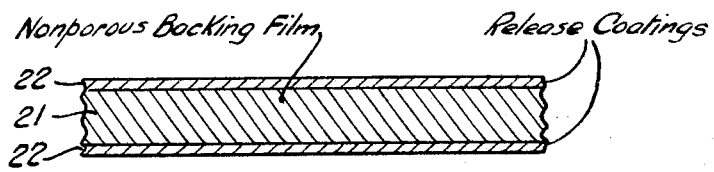
FIG. 2 is a similar schematic sectional view of a release sheet according to a different embodiment of the invention.

In still another embodiment of this invention, shown in FIG. 2, a release sheet is provided which comprises a thin, flexible and substantially nonporous backing film 21 and release coatings 22, according to this invention, on each side of the backing 21. This type of release sheet is sometimes called a liner and is adapted to be interleaved with a pressure-sensitive adhesive tape, most commonly with a double-faced pressure-sensitive tape, i.e., a tape having adhesive layers on both surfaces, in such a way that the release sheet separates adjacent layers of tape when the tape is wound upon itself with the release sheet to form a roll, not shown. In another form, also not shown, the release sheet has a release coating only on one side and is used to contact the adhesive layer of a single-faced adhesive tape or sheet for protective purposes. Thus, the product of this embodiment of this invention may be described generally as a release sheet in the form of a thin, flexible and substantially nonporous backing sheet or film and a release coating of this invention on one side of the backing. In such a sheet, the release coating is adapted to enter into intimate protective contact with a normally tacky and pressure-sensitive adhesive layer to provide uniform and easy release from the adhesive layer whether or not it is applied directly to the tape backing itself, or to one or both sides of a separate release sheet adapted to contact the adhesive layer.

Figure 3:
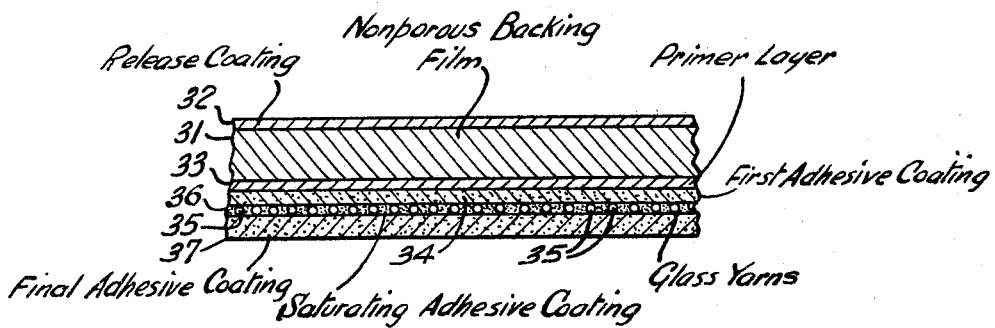
FIG. 3 is a schematic sectional view of a strand-reinforced pressure-sensitive adhesive tape according to a somewhat different embodiment of the invention and taken transversely of the tape to show the relative positions of the strands.

The embodiment of FIG. 3 comprises a nonporous backing film 31, and a release coating 32, according to this invention, on one side of the backing. The following coatings are applied to the opposite side of the backing 31 in the order indicated, i.e., a thin primer layer 33 applied directly to the backing, a first adhesive coating 34, a layer of glass yarns 35 imbedded in a saturating adhesive coating 36 and a final pressure-sensitive adhesive coating 37, applied over the saturating adhesive. The release coating 32 provides easy and relatively uniform unwind without offsetting of adhesive when the resulting tape is wound upon itself in the form of a roll and then partially unwound to the extent desired for use. The strands 35 assure that the tape possesses high tensile strength and tear resistance and is particularly suitable for use as a strapping tape.

Figure 4:
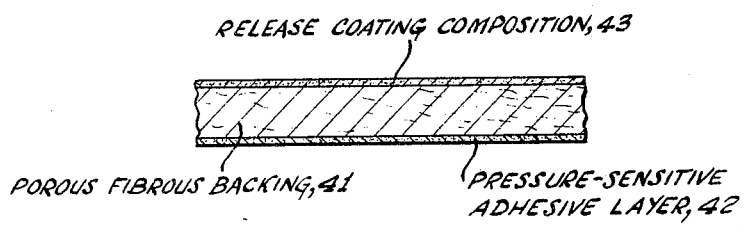
FIG. 4 is a schematic sectional view of a pressure-sensitive adhesive tape according to still another embodiment of the invention.

Referring to FIG. 4 of the drawings, there is shown a pressure-sensitive adhesive tape according to one embodiment of this invention which comprises a porous fibrous paper backing 41, a pressure-sensitive adhesive layer 42 on one side of the backing, and a layer 43 of a release coating composition on the other side of the backing. The backing is a creped saturating paper impregnated with a unifying agent of the type described hereinafter in the examples. This tape is adapted to be wound upon itself to form a roll with the pressure-sensitive adhesive layer 42 down, or facing inwardly, in such a way that the underside of the adhesive layer 42 in each convolution of the roll is in intimate contact with the top surface of the release layer 43. As described hereinbefore, when the tape is unwound, the adhesive layer separates easily from the release layer without the necessity for applying excessive force and without any offsetting of the adhesive on the release layer.

Figure 5:
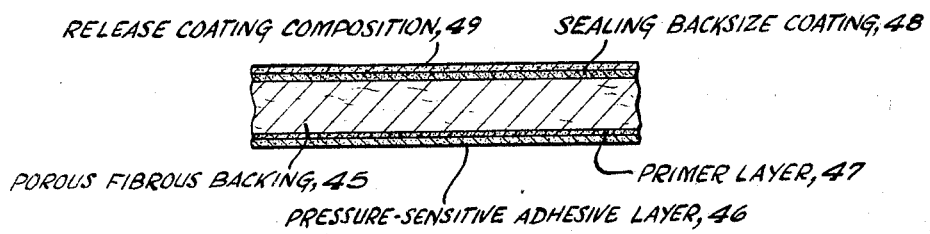
FIG. 5 is a similar schematic sectional view of a pressure-sensitive adhesive tape according to another embodiment of the invention.

FIG. 5 illustrates pressure-sensitive adhesive tape according to a somewhat different embodiment of the invention which comprises a porous fibrous backing 45 similar to the backing 41 of the tape of FIG. 4, a pressure-sensitive adhesive layer 46 on the underside of the backing, and a layer 49 of a release coating composition according to this invention on the top side of the backing.

To assure that the adhesive layer adheres firmly to the backing, a conventional primer layer 47 is applied between the backing and the adhesive layer. A sealing backside layer, or coating, 48 is applied to the topside of the backing in this embodiment prior to application of the release coating layer 49. The sealing coating 48 may consist of the film former utilized in the release coating composition of this invention without the release agent. The function of the sealing layer 48 is to fill the surface interstices of the backing to minimize the amount of the release coating composition which must be applied to provide a tape according to this invention.

Figure 6:
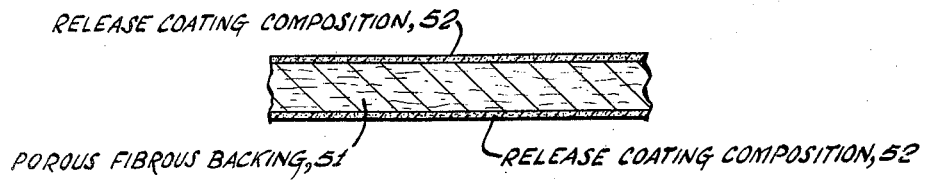
FIG. 6 is a schematic sectional view of a release sheet according to still a different embodiment of this invention.

In still another embodiment of this invention, shown in FIG. 6, a release sheet is provided which comprises a porous fibrous backing 51 and release layers 52 of release coating composition, according to this invention, on each side of the backing 51. The backing 51 is a smooth or creped saturating paper impregnated with a unifying agent of the type described herein. This type of release sheet is some times called a liner and is adapted to be interleaved with a pressure-sensitive adhesive tape, most commonly with a double-faced pressure-sensitive tape, i.e., a tape having adhesive layers on both surfaces, in such a way that the release sheet separates adjacent layers of tape when the tape is wound upon itself with the release sheet to form a roll, not shown. In another form, also not shown, the release sheet has a release coating only on one side and is used to contact the adhesive layer of a single-faced adhesive tape or sheet for protective purposes. Thus, the product of this embodiment of this invention is similar to that of FIG. 2 and may be described generally as a release sheet in the form of a porous fibrous backing and a release layer comprising the release coating composition of this invention on one side of the backing. As described in connection with FIG. 2, the release layer is adapted to enter into intimate protective contact with a normally tacky and pressure-sensitive adhesive layer to provide uniform and easy release from the adhesive layer whether or not it is applied directly to the tape backing itself, or to one or both sides of a separate release sheet adapted to contact the adhesive layer.

The following are specific examples which are illustrative of this invention.

EXAMPLE I 49.8 grams stearyl methacrylate, 60.9 grams acrylonitrile, and 1.00 gram benzoyl peroxide are mixed. In a 500 cc. round bottom 3-neck flask equipped with stirrer, reflux condenser and heating mantle, 200 grams toluene are brought to reflux. The monomer mixture is then added at a rate of approximately 10 cc. every 15 minutes over a period of 3 hours, the temperature meanwhile dropping from 112° C. to 92° C. After a further two hours heating at 92–94° C. extra catalyst consisting of 0.33 gram benzoyl peroxide dissolved in 3.3 grams toluene is added. The reaction flask is then heated a further 3 hours (total reaction time; 8 hours) at 94–98° C. The product has a percent solids of 25.6%, a nonvolatile at 204° C. 10 mm. Hg 15 minutes of 24.8%, and the fraction precipitated with an equal weight of methanol is 25.0%. The intrinsic viscosity of the precipitated polymer determined in methyl ethyl ketone-toluene 1 to 4 is 0.04 and the acrylonitrile content of the precipitated polymer by nitrogen analysis is 47.1%. The stearyl methacrylate content by difference is 52.9%. The softening point is 210° F.

This release agent solution is diluted to 2% solids with toluene-methyl ethyl ketone 3 to 1 and coated on 2 mil cellulose acetate film to a dry coating weight of approximately 0.005 ounce per square yard, the solvent being removed by heating 5 minutes at 65° C. A primer coat is applied to the opposite side at a dry weight of approximately 0.02 ounce per square yard, and after drying an adhesive coat is applied over the primer coat, the adhesive having the following composition in parts by weight on the solids basis:

| | |
|---|---|
| Pale crepe rubber | 100 |
| Polyterpene resin 115° C. M.P. | 100 |
| Polyterpene resin 40° C. M.P. | 10 |
| Butylated urea formaldehyde resin solids | 15 |
| 2,5-di-tertiary-amylhydroquinone | 2 |
| Zinc dibutyldithiocarbamate | 2 |
| p-Toluene sulfonic acid | 2.95 |

After drying the adhesive the tape is slit and rolled into rolls.

Unwind adhesion is 17 ounces per inch initially, 17 ounces after 6 days 120° F. aging, and 40 ounces after 6 days 150° F. aging. Whenever the term "unwind adhesion" is used in this application in referring to a tape or release sheet, it shall mean the force in ounces per inch of width required to unwind the tape or sheet at 150 feet per minute while drawing the end thereof radially away from a roll of the tape or sheet wound upon itself and mounted on a free-turning mandrel. Quickstick, 1.14 initially, was 0.86 after 6 days 120° F. aging and 0.83 after 6 days 150° F. aging. The quickstick, which is a very sensitive measure of detackification, is determined as follows: A strip of the tape is laid on a horizontal surface, and a hollow plastic ball is rolled down an incline onto the tape. The vertical height from which the ball started is noted, and the distance the ball rolls along the tape before coming to rest is measured. The quickstick is reported as the height in inches raised to the three-halves power, divided by the distance roll in inches. This ratio is found to be a constant for a given tape. The ball used is made of nitrocellulose, is 1.5 inches in diameter, and weighs 1.916 grams. It is cleaned with petroleum ether and dried before use. The tape performs excellently in normal applications for acetate film backed tapes, such as paper mending, package sealing, and the like.

EXAMPLE II 100 grams toluene is heated to reflux in a 500 cc. round bottom 3-neck flask equipped with stirrer, reflux condenser and heating mantle, and a mixture of 69.2 grams stearyl methacrylate, 41.5 grams acrylonitrile and 1.00 gram benzoyl peroxide is added at an approximate rate of 10 ml. every 15 minutes over a period of 3 hours while the temperature gradually falls from 111° C. to 91° C. After an additional 2 hours heating at 91–97° C. an additional 0.33 gram benzoyl peroxide dissolved in 3.3 grams toluene is added, and heating is continued for an additional 3 hours (8 hours total reaction time) at 97–98° C. The product has a solids content of 45.6%, a nonvolatile at 204° C. 10 mm. Hg 15 minutes of 41.3%, and on precipitation of 76.9 grams of the product with 300 grams methanol a precipitate amounting to 44.8% of the product is obtained. The acrylonitrile content by nitrogen analysis is 37.5% and the stearyl methacrylate content by difference is 62.5%. The intrinsic viscosity of the methanol precipitate is 0.11 determined at 30° C., in a 4 to 1 toluene-methyl ethyl ketone solvent. The softening point is 165° F.

Tape is prepared as in Example I, but with substitution of the above release agent. Unwind adhesion initially is 18 ounces per inch width, after 6 days 120° F. aging is 41 ounces. Quickstick initially is 3.8, after 6 days 120° F. aging is 4.2, and after 6 days 150° F. aging is 3.6. The tape performs well as the mending and sealing tape.

EXAMPLE III

A release agent is prepared as follows: 39.7 pounds of toluene is placed in a 20 gallon stainless steel reactor equipped with condenser and stirrer and heated to reflux. A mixture of 24.2 pounds stearyl methachylate, 19.7 pounds acrylonitrile and 0.4 pound azo-bis-isobutyronitrile is added to the reactor at a rate of approximately 0.25 pound per minute over a three hour period while the temperature gradually falls from 110° C. to 90° C. The temperature is then raised and held at 96 to 100° C. for the balance of the reaction time. Two hours after addition of the monomer-catalyst mixture is completed a further addition of 0.13 pound azo-bis-iso-butyronitrile dissolved in 1.77 pounds of toluene is made. The heating is continued from this point for a further 3 hours, total reaction time 8 hours, at which point 80 pounds of toluene are added to cool the product and reduce it to a convenient viscosity.

The solids content of the product is determined to be 25.2%, the non-volatile at 204° C., 10 mm. Hg pressure, for 15 minutes is 24.2%, and a 204 gram sample precipitated with 200 grams of methanol yields a dried precipitate amounting to 24.5% of the product. The Brookfield viscosity at 79° F., #1 spindle, 60 r.p.m., is 98 centipoises. The softening point of the methanol precipitated polymer is 85° C., its intrinsic viscosity in methyl ethyl ketone-toluene 1 to 3 by volume is 0.131 determined at 30° C., and its number average molecular weight is 5,840. Its acrylonitrile content by nitrogen determination is 45.5%, and its stearyl methacrylate content by difference is 54.5%. The release agent is diluted to 2% solids using a 3 to 1 mixture of toluene and methyl ethyl ketone, and coated on 1.5 mil cellulose acetate film using a print roll applicator to give a dry coating weight of approximately 0.005 ounce per square yard. At the same time a primer is printed on the opposite side to give a dry coating weight of approximately 0.02 ounce per square yard. After steam can drying, an adhesive having the following composition is coated over the primer:

| | |
|---|---|
| Pale crepe rubber | 87.5 |
| Styrene-butadiene copolymer | 12.5 |
| Aluminum hydrate | 50 |
| 2,6-m-tolylene diisocyanate | 2.2 |
| Rosin modified phenol formaldehyde resin M.P. 150° C. | 10 |
| 2,5-di-tert-amyl hydroquinone | 2 |
| Di-tert-butyl-p-cresol | 2 |
| Zinc dibutyl dithiocarbamate | 2.5 |
| Polyterpene resin M.P. 115° C. | 80 |

This coating is from a 28% solids solution in toluene and a dry weight of 0.75 ounce per square yard is applied. 64 parallel strands of 150–1/0 glass yarns per inch of width are then applied over this coating, and another coating of 1.10 ounces per square yard dry weight of the above adhesive is applied from 22% solids solution to saturate these yarns. A 1.5 ounces per square yard dry weight coating of the following adhesive dissolved in toluene is then applied to a silicone coated release paper;

| | |
|---|---|
| Pale crepe rubber | 100 |
| Phenolic modified polyterpene resin M.P. 115° C. | 40 |
| Glycerol ester of hydrogenated resin M.P. 80° C. | 30 |
| Polyterpene resin M.P. 40° C. | 20 |
| Oil soluble heat hardening phenolic resin | 5 |
| Zinc resinate | 5 |
| Zinc dibutyl dithiocarbamate | 1 |
| 2,5-di-tert-amyl-hydroquinone | 2 |
| Dipentamethylene thiuram tetrasulfied | 1 |

This coating is dried to remove solvent, cured by heating 45 seconds at 355° F., and then transferred to the previously prepared yarn-laminated backing to form the final adhesive coating after removing the silicone carrier paper. The resulting tape, now according to the embodiment shown schematically in FIG. 3, is slit and rolled upon itself to form a tape roll which may be easily unwound.

The above tape has the following properties: 33 ounces adhesion to steel (PSTC–1 method), 53 Quickstick, unwind adhesion at 150 feet per minute of 43 ounces per inch width, and a zero degree hold to boxboard of three hours. After aging the rolls 6 days at 150° F. the corresponding properties are 31 ounces per inch adhesion, 47 Quickstick, 73 ounces per inch unwind adhesion and 4 hours zero degree hold to boxboard. Zero degrees hold to boxboard is determined by applying a 1½ inch long by ½ inch wide strip of tape to boxboard, suspending a 2000 gram weight from the tape end to apply a zero degree shearing force, and measuring the time to failure at 70° F.

The above tape has excellent properties as a packaging tape, useful for sealing heavy cardboard cartons, holding refrigerator doors closed in shipment, bundling heavy objects such as lumber, pipe or automotive parts and the like. The tape adheres well to its own backing so that there is no problem with loosening of the end when more than one wrap is made around a bundle, yet the roll unwinds with sufficient ease to be handled without difficulty.

EXAMPLE IV

The release agent used is the same as in Example III. A release coat solution is prepared by dissolving an emulsion terpolymer of of ethyl acrylate-styrene-methacrylic acid in methyl ethyl ketone and adding the 25% solids solution of the release agent in toluene after complete solution of the terpolymer is effected. The proportions are such as to give a solids ratio of terpolymer to release agent of 1 to 4 and a total solids content of 2 percent. This is coated on a regenerated cellulose film plasticized with 15 percent polyethylene glycol using a print roll applicator, to give a dry weight of coating of approximately 0.005 ounce per square yard. At the same time a primer coat is applied to the opposite side, also by print roll, to a dry coating weight of approximately 0.02 ounce per square yard, and these coats are dried on steam heated drying cans. An adhesive coat of the following composition in parts by weight is applied from toluene solution over the primer coat and dried:

Synthetic polyisoprene, high cis _____ 100
Polyterpene resin M.P. 115° C. _____ 30
Polyterpene resin M.P. 125° C. _____ 40
Di-t-butyl-p-cresol _____ 1

A dry weight of 0.7 ounce per square yard of this adhesive is used. The tape is then slit into narrow widths and wound on cores. The properties of this tape are as follows:

|  | Adhesion to steel | Quickstick | Unwind Adhesion |
| --- | --- | --- | --- |
| Initial | 41 | 8.0 | 22 |
| 6 days aging 120° F | 49 | 5.6 | 30 |
| 6 days aging 150° F | 42 | 4.5 | 32 |

EXAMPLE V

The release agent of Example III is diluted to 2% solids with a 3 to 1 toluene-methyl ethyl ketone solvent and coated on 2 mil cellulose acetate film by a print roll applicator to give a dry weight of approximately 0.005 ounce per square yard and dried by passing over steam heated cans. On the opposite side an adhesive coating of dry weight 0.8 ounce per square yard is applied from toluene solution and dried. The adhesive composition, in parts by weight of solids, is:

2-ethyl hexyl acrylate-vinylacetate copolymer _____ 43.3
Polyvinyl ethyl ether _____ 25.4
2,5-di-tert-amyl hydroquinone _____ 1.3

The resulting tape is slit and wound on cores.
The properties are as follows:

|  | Initial | Aged 1 week 120° F. | Aged 2 weeks 120° F. | Aged 6 mos. room temp. |
| --- | --- | --- | --- | --- |
| Adhesion to steel | 27 | 26 | 25 | 32 |
| Unwind adhesion | 7 | 7 | 8 | 8 |

The tape performs very well in mending and sealing and other packaging applications.

EXAMPLE VI

The release coated backing of Example V is primed and then coated over the primer with 1.0 ounce dry weight per square yard of the following adhesive.

Pale crepe rubber _____ 95
High cis-polyisoprene rubber _____ 112.5
Styrene butadiene copolymer _____ 100.8
Aluminum hydrate _____ 111
Lanolin _____ 3.2
Di-tert-butyl-p-cresol _____ 7.2
2,5-di-tert-amyl hydroquinone _____ 4.0
Polyterpene resin M.P. 115° C. _____ 138.2
Zinc resinate _____ 24.0
Oil soluble heat hardening phenolic resin _____ 50.4
Phenolic modified polyterpene resin M.P. 115° C. __ 30.0

This is coated from solution in toluene and dried, and the resulting tape slit and wound on cores.
The tape has the following properties:

|  | Initial | Aged 1 week 120° F. | Aged 2 weeks 120° F. |
| --- | --- | --- | --- |
| Adhesion to steel | 44 | 48 | 40 |
| Quickstick | 0.14 | 0.50 | 0.33 |
| Unwind adhesion | 10 | 16 | 16 |

The tape performs very well as an electrical insulating and holding tape.

EXAMPLE VII

Tape is prepared as in Example VI, but with 1.10 ounces per square yard of adhesive on a dry basis, and with 1 mill polyester film substituted for the cellulose acetate. The following properties are obtained:

|  | Initial | Aged 1 week 120° F. | Aged 2 weeks 120° F. |
| --- | --- | --- | --- |
| Adhesion to steel | 47 | 45 | 46 |
| Quickstick | 0.20 | 0.25 | 0.33 |
| Unwind adhesion | 13 | 28 | 29 |

This tape also performs excellently as an electrical insulating and holding tape in applications where the greater strength of polyester film backing is required.

EXAMPLE VIII 39.7 pounds of toluene is charged to a 20 gallon stainless steel reactor equipped with condenser and stirrer, and heated to reflux. A separate mixture of 24.2 pounds stearyl methacrylate, 19.7 pounds acrylonitrile and 0.4 pound benzoyl peroxide is prepared, and this mixture then is added gradually to the reactor at a rate of about 0.25 pound per minute over a period of three hours. The stearyl methacrylate used in this and other examples is a technical grade made by esterifying methacrylic acid with mixed fatty alcohols with n-octadecyl alcohol predominating. The actual composition of the stearyl methacrylate is approximately 64 percent n-octadecyl methacrylate 34 percent n-hexadecyl methacrylate, and 2 percent n-tetradecyl methacrylate. During the addition, the pot temperature gradually drops from 110° C. to about 90° C. The temperature then rises to 98° C. and is maintained at 96 to 100° C. during the balance of the reaction. Five hours after the start of the monomer addition, a further catalyst addition of 0.13 pound benzoyl peroxide dissolved in 1.3 pounds toluene is made. After a further 3 hours (8 hours total reaction time), heating is stopped and 39.7 pounds of additional toluene is added to dilute the product to convenient consistency, and the product is withdrawn from the reactor. The percent solids is found to be 29.8 percent, determined by heating 3 hours at 130° C. The percent non-volatile determined at 10 mm. Hg pressure and 204° C. for 15 minutes is 28.0 percent (this procedure volatilizes any unreacted stearyl methacrylate). The viscosity at 79° F. as determined by a Brookfield viscosimeter using a number four spindle at 60 r.p.m. is 7,850 centipoises. On dilution of a small quantity of the product with an equal weight of methanol, precipitating the polymer, the dried precipitate is found to be 25.8 percent of the product. The precipitated product is insoluble in methanol and hexane, soluble in ethyl acetate, benzene, toluene, cyclohexanone, dimethyl formamide, methyl ethyl ketone and acetone. The intrinsic viscosity of the precipitated polymer determined in methyl ethyl ketone-toluene solvent (1 to 4 by weight) is 0.14 at 30° C. Its softening point as determined on a Kofler melting bar apparatus is 85° C. The percent acrylonitrile in the precipitated polymer, by nitrogen determination, is found to be 39.2 percent, the stearyl methacrylate content by difference being 60.8 percent. The number average molecular weight is 24,600.

An alkyd resin is prepared from the following ingredients, the amounts listed being in parts by weight:

| | |
|---|---|
| Phthalic anhydride | 44.2 |
| Benzoic acid | 1.6 |
| Fumaric acid | 0.9 |
| Coconut oil fatty acids | 27.1 |
| Glycerine | 31.6 |

This is cooked in a resin kettle using normal alkyd resin manufacturing techniques until 5.4 parts by weight of water of esterification has been removed and the acid number has decreased to 12 based on the resin solids. Heating is then discontinued and the batch is cooled and diluted to 50 percent solids, the final solvent composition by weight being 75% xylene to 25% mineral spirits. The viscosity of the final resin solution is 3600 centipoises at 25° C., its acid number is 6, and its Gardner color is 5.

A backsize composition is prepared by blending 150 parts of the above alkyd resin solution (50 percent solids), 50 parts of RS 2595 butylated melamine-formaldehyde resin solution (50 percent solids) 2.5 parts of Beckamine P 198 (an alkyl acid phosphate curing catalyst commercially available from Reichhold Chemical Co.), 16.7 parts of the above release agent solution (29.8 percent solids), and 139 parts additional toluene solvent. The RS 2595 is a commercially available melamine-formaldehyde resin solution manufactured by Pittsburgh Plate Glass Co., having a percent solids of 50 percent, the solvent being a mixture of equal parts of n-butanol and xylene, an acid number less than 1, a Gardner color of approximately 1, a viscosity of 65 to 140 centipoises (Brookfield LVO viscometer, #2 spindle, 60 r.p.m., 25° C.), and a gel time of approximately 10–20 minutes @ 115 to 118° C. when catalyzed with 1 part of the Beckamine P 198 alkyl acid phosphate per 40 parts melamine resin solution, the gel time being determined with a Sunshine Gel Time Meter by heating 15 grams of the catalyzed mixture in a test tube in an oil bath.

The above backsize composition is coated on a paper masking tape backing at a dry weight of 0.27 ounce per square yard, air dried and cured 20 seconds at 325° F. The backing used is prepared as follows: A 33 pound per ream (24" x 36"—480 sheets) natural kraft paper, Brown Paper Company's Grade 5321, having a machine direction dry tensile strength of 11 pounds per inch, percent elongation of 5 percent, wet tensile strength 5 pounds per inch and Gurley density of 4 to 10 seconds (2 ply, 400 cc.), is saturated with a rubbery impregnant to a dry pickup of 35 percent of the original weight of the paper. The impregnant used is a mixture having the following solids composition:

| Constituent: | Parts by Weight |
|---|---|
| Butadiene-styrene copolymer | 1141.0 |
| Carboxyl containing butadiene-acrylonitrile copolymer | 1141.0 |
| Water soluble heat reactive phenol formaldehyde resin | 48.0 |
| Tetrasodium salt of ethylene diamine tetracetic acid | 11.1 |
| Antioxidant (diphenyl amine-acetone reaction product) | 1.9 |
| Ammonium polyacrylate thickener | 21.2 |

The impregnated sheet is then moistened, longitudinally compressed by 12 percent of its original length and dried, giving a final percent elongation of 15 percent.

The backsized backing then is coated, on the side opposite the backsize, with an adhesive having the following composition:

| Constituent: | Parts by weight |
|---|---|
| Pale crepe natural rubber | 50 |
| Styrene-butadiene copolymer rubber | 50 |
| Zinc oxide | 55.3 |
| Di-tertiary butyl p-cresol | 2.18 |
| 2,5-di-tert-amyl hydroquinone | 2.18 |
| Diethylene glycol ester of disproportionated rosin | 109 |
| Heat reactive oil soluble phenol formaldehyde resin | 8.2 |
| Tetra sodium salt of ethylene diamine tetraacetic acid | .56 |
| Toluene | 435 |

After coating the solvent is dried from the above adhesive, giving a dry weight of 2.0 ounces per square yard. The adhesive coated tape then is cured 2½ minutes at 280° F. The material is then slit into narrow widths and rolled up in rolls.

The above tape is found to have an unwind adhesion at 150 feet per minute of 20 ounces per inch width when measured as described in Example I. After aging six days at 120° F. the unwind adhesion rises only to 45 ounces per inch, and after 6 days at 150° F. only to 51 ounces per inch. The quickstick, initially 2.00, drops only slightly in aging, to 1.53 after both 120° F. and 150° F. aging. Tape never wound upon itself also has a quickstick of 2.00.

This tape is evaluated as a masking tape in spray painting and is found to be entirely satisfactory in "shingling" ability, and in freedom from paint flaking. It performs very satisfactorily on a masker, with no tendenecy to pucker or wrinkle the masking paper, such as occurs with stretchy tapes when the unwind adhesion is too high.

A tape made in the identical way, but without including the release agent of this invention in the backsize composition, develops over 100 ounces per inch unwind adhesion after aging 6 days at 120° F.

EXAMPLE IX

A tape is prepared as in Example VIII except for the use of a different proportion of release agent in the backsize and a different adhesive. In this example, 37.2 parts of the release agent is used instead of 16.7. The adhesive has the following composition:

| Constituent: | Parts by weight |
| --- | --- |
| Synthetic polyisoprene rubber, high cis | 50 |
| Styrene-butadiene copolymer containing 27% naphthenic oil | 50 |
| Polyterpene resin tackifier (M.P. ballandring 70° C.) | 75 |
| 2,5-di-tert-amyl hydroquinone | 1.5 |
| Di-tertiary butyl p-cresol | 1.5 |
| Butylated urea-formaldehyde resin (50% in butanol-xylol) | 16 |
| Zinc dibutyl dithiocarbamate | 2 |
| p-Toluene sulfonic acid | 2.2 |
| Toluene | 596 |
| Isopropyl alcohol | 55 |

Tape made in this way has an initial unwind adhesion of 13 ounces per inch, an adhesion of 53 ounces per inch after 6 days at 120° F. and 58 ounces per inch after 6 days at 150° F. Its initial quickstick is 3.4, 2.6 after 6 days at 120° and 3.4 after 6 days at 120° F. This tape performs very satisfactorily as a masking tape.

EXAMPLE X

The present example illustrates the very superior properties obtainable with lower molecular weights.

A release polymer is prepared as follows: 121.8 grams stearyl methacrylate, 99.6 grams acrylonitrile and 2.00 grams benzoyl peroxide are mixed together. 400.0 grams of toluene is heated to 80° C. in a glass reaction kettle equipped with mechanical stirrer, reflux condenser and heating mantle. The monomer-catalyst mixture is added at a rate of 20 cc. every 15 minutes over a period of 3 hours, while holding the temperature in the kettle at 80° C. After a further 2 hours' reaction time at 80° C. an addition of a further 0.66 gram of benzoyl peroxide in 6.6 grams toluene is made. After a further 3 hours (total reaction time 8 hours) the reaction mixture is cooled and removed from the kettle.

The percent solids of the product is 28.8 percent (3 hours at 130° C.) and the percent nonvolatile at 204° C., 10 mm. Hg pressure for 15 minutes is 26.8 percent. The Brookfield viscosity, No. 1 spindle 60 r.p.m., is 16 centipoises at 79° F. A 105 gram portion of the product is precipitated with 100 grams methanol, and dried, the dried precipitate amounting to 27.8 percent by weight of the product. The acrylonitrile content of the precipitated polymer by nitrogen analysis is 35.6 percent, and the stearyl methacrylate content, by difference, is 64.4 percent. The softening point of the precipitated polymer is 165° F., the intrinsic viscosity determined in toluene-methyl ethyl ketone 4–1 at 30° C. is 0.02, and the number average molecular weight is 3,430.

Release coating compositions are prepared using the alkyd resin, the melamine-formaldehyde resin and the curing catalyst of Example VIII in the proportion of 75 to 25 to 2.5, respectively, on a solids basis, adding 2.5, 5.0 and 10.0 parts of the above release agent solids per 100 parts combined alkyd-melamine-release agent solids. In each case, the composition is adjusted to 30 percent solids by addition of toluene. Coatings are made on the same backing as Example VIII, dried and cured under the same conditions. The adhesive of Example IX is applied. The finished tapes have the following unwind and quickstick properties:

| Percent release agent solids | Unwind (oz./in.) | | | Quickstick | | |
| --- | --- | --- | --- | --- | --- | --- |
|  | 2.5 | 5.0 | 10.0 | 2.5 | 5.0 | 10.0 |
| Initial values | 26 | 22 | 24 | 1.61 | 1.65 | 2.00 |
| After 6 days 120° F | 46 | 46 | 45 | 1.74 | 1.74 | 1.75 |
| After 6 days 150° F | 44 | 46 | 55 | 1.96 | 1.96 | 1.87 |

The above results illustrate both the excellent retention of properties during aging, and lack of sensitivity to the amount of the release agent used in the backsize. All three of the above tapes show excellent performance on maskers and in spray painting. No problem appears with either "shingling" or flaking.

EXAMPLE XI 200.0 grams of toluene is heated to reflux in a one liter glass reaction kettle equipped with condenser, stirrer and heating mantle. A mixture of stearyl methacrylate 75.8 grams, acrylonitrile 34.9 grams, and azo-bis-isobutyronitrile 2.0 grams, is added at a rate of approximately 10 ml. every 15 minutes over a period of three hours during which time the temperature in the reaction kettle gradually falls from 110° C to 100° C. After a further two hours at 100–102° C., an extra addition of 0.66 gram azo-bis-isobutyronitrile catalyst dissolved in 6.6 grams toluene is made. The reaction temperature is kept at 102–107° C. for an additional three hours, making the total reaction time 8 hours. The solids content of the product is 29.5 percent, the non-volatile at 204° C. 10 mm. Hg pressure for 15 minutes is 27.7 percent, and the dried precipitate resulting from precipitation with an equal weight of methanol is 25.0 percent. The number average molecular weight of the methanol precipitated polymer is 4,000, and the intrinsic viscosity is .066. Its acrylonitrile content by nitrogen analysis is 33.2 percent and its stearyl methacrylate content by difference is 66.8 percent.

A backsize composition is prepared using 150 parts of the alkyd solution of Example VIII, 50 parts of the formaldehyde resin solution of Example VIII, 2.5 parts of the alkyl acid phosphate of Example VIII, 17.0 parts of the above release agent solution at 29.5 percent solids, and 165 parts of toluene, all by weight. This is coated on a paper masking tape backing at a dry weight of 0.25 ounce per square yard, using a No. 7 Meier rod, air dried, and cured 30 seconds at 325° F. The backing used is prepared from a 28.5 pound per ream (480 sheets, 24" x 36") creped kraft saturating paper, having a Gurley density of 6–12 seconds (2 ply, 400 cc.), a machine direction tensile strength of 10 pounds per inch width, an elongation at break of 14 percent, and a wet tensile strength of 0.5 pound per inch. This is saturated with a latex composition of the same formula used in the previous examples to obtain a dry pickup of 55 percent of the original weight of the paper, dried, and cured to a wet tensile strength of 7.5 pounds per inch width.

The release coated backing thus prepared is coated on the side opposite the backsize with an adhesive of the same composition as Example VIII, to a dry weight of adhesive of 1.9 ounces per square yard, dried, and cured 2½ minutes at 280° F. The finished tape is slit and wound on rolls.

The finished tape of this example has an initial unwind adhesion of 4.5 ounces per inch, and when three weeks old has an unwind adhesion of 15 ounces. After 6 days aging at 120° F. the unwind adhesion is 26 and after 6 days aging at 150° F. is 23 ounces per inch. The quickstick, initially 2.35, is 1.40 after 6 days at 120° F. and 2.10 after 6 days at 150° F. The tape performs very satisfactorily on a masker and in all automotive masking operations, and is quite satisfactory in "shingling" ability and freedom from paint flaking.

EXAMPLE XII

A release agent is prepared as follows: 39.7 pounds of toluene is placed in a 20 gallon stainless steel reactor equipped with condenser and stirrer and heated to reflux. A mixture of 24.2 pounds stearyl methacrylate, 19.7 pounds acrylonitrile and 0.4 pound azo-bis-isobutyronitrile is added to the reactor at a rate of approximately 0.25 pound per minute over a three hour period while the temperature gradually falls from 110° C. to 90° C. The temperature is then raised and held at 96° C. to 100° C. for the balance of the reaction time. Two hours after addition of the monomer-catalyst mixture is completed, a further addition of 0.13 pound azo-bis-isobutyronitrile dissolved in 1.77 pounds of toluene is made. The heating is continued from this point for a further 3 hours, total reaction time 8 hours, at which point 80 pounds of toluene are added to cool the product and reduce it to a convenient viscosity.

The solids content of the product is determined to be 25.2 percent, the non-volatile at 204° C., 10 mm. Hg pressure, for 15 minutes is 24.2 percent, and a 204 gram sample precipitated with 200 grams of methanol yields a dried precipitate amounting to 24.5 percent of the product. The Brookfield viscosity at 79° F., #1 spindle, 60 r.p.m., is 98 centipoises. The softening point of the methanol precipitated polymer is 85° C., its intrinsic viscosity in methyl ethyl ketone-toluene 1 to 3 by volume is 0.131 determined at 30° C., and its number average molecular weight is 5,840. Its acrylonitrile content by nitrogen determination is 45.5 percent.

A backsize composition is prepared using 150 parts of the alkyd solution of Example VIII, 50 parts of the melamine-formaldehyde resin solution of Example VIII, 2.5 parts of the alkyl acid phosphate catalyst of Example VIII, and 39.7 parts of the above release agent solution at 25.2 percent solids. This is equivalent to 10 parts of release agent solids per 100 parts of combined alkyd and melamine formaldehyde resin solids.

This is coated on the backing of Example XI, dried, and cured 10 seconds at 325° F. 1.90 ounces per square yard dry weight of the adhesive of Example VIII is coated on the side opposite the backsize, dried, and cured 30 seconds at 350° F. The tape then is slit into narrow widths and wound in rolls.

The unwind adhesion of this tape is measured after aging for various periods of time under different conditions, with the following results:

| Aging conditions | Unwind adhesion (ounces per inch) after aging for period of— | | | | |
|---|---|---|---|---|---|
| | 1 wk. | 1 mth. | 2 mths. | 3 mths. | 6 mths. |
| 0° F., 50% R.H. | 8 | 6 | 12 | 14 | 11 |
| 100° F., 10% R.H. | | 12 | | 19 | |
| 120° F., 10% R.H. | | 29 | | 35 | |
| 150° F., 35% R.H. | 25 | 27 | 28 | | |

The quicksticks determined under the same aging conditions are as follows:

| Aging conditions | Quickstick after aging for period of— | | | | |
|---|---|---|---|---|---|
| | 1 wk. | 1 mth. | 2 mths. | 3 mths. | 6 mths. |
| 0° F., 50% R.H. | 1.28 | 2.00 | 2.08 | 1.85 | 1.95 |
| 100° F., 10% R.H. | | 1.30 | | 2.00 | |
| 120° F., 10% R.H. | | 2.50 | | 1.60 | |
| 150° F., 35% R.H. | 1.85 | 2.50 | 1.50 | | |

Obviously, the properties of this tape are remarkably stable over long periods at either normal or elevated temperatures. This tape also is tested extensively for performance as an automotive masking tape. It performs extremely well, both initially and after several months aging at ambient room temperature conditions. It handles well on maskers, application is easy, and there is no problem with "shingling" or flaking of paint.

EXAMPLE XIII

Tape is prepared in the identical manner as in Example XII, but using an adhesive of the following solids composition:

| Constituent: | Parts by weight |
|---|---|
| Pale crepe natural rubber | 100 |
| Aluminum hydrage | 10 |
| Zinc dibutyl dithiocarbamate | 1 |
| 2,5-di-tert-amyl hydroquinone | 2 |
| Polyterpene resin, M.P. 115° C. | 51 |
| Zinc resinate | 12 |
| Heat hardening oil soluble phenol formaldehyde | 7 |

This adhesive is coated from solution in toluene, dried, and cured at 325° F. in 20 seconds.

This tape has the following unwind properties after aging:

| Aging conditions | Unwind adhesion (ounces per inch) after aging for period of— | | | | | |
|---|---|---|---|---|---|---|
| | 1 Wk. | 2 Wks. | 3 Wks. | 1 Mth. | 2 Mths. | 3 Mths. |
| 70° F., 50% R.H. | 29 | | 29 | 29 | 29 | 30 |
| 100° F., 10% R.H. | 34 | | 36 | 37 | 38 | 39 |
| 120° F., 10% R.H. | 40 | | 40 | 45 | 45 | 46 |
| 150° F., 35% R.H. | 54 | 57 | 56 | | | |

The corresponding quicksticks are determined to be as follows:

| Aging conditions | Quickstick after aging for period of— | | | | | |
|---|---|---|---|---|---|---|
| | 1 Wk. | 2 Wks. | 3 Wks. | 1 Mth. | 2 Mths. | 3 Mths. |
| 70° F., 50% R.H. | 33 | | 19 | 25 | 22 | 22 |
| 100° F., 10% R.H. | 50 | | 31 | 31 | 16 | 27 |
| 120° F., 10% R.H. | 36 | | 36 | 29 | 27 | 40 |
| 150° F., 35% R.H. | 50 | 36 | 40 | | | |

Although adhesion to steel is not as sensitive a measure of detackification by release agents as is quickstick, still it does decrease drastically on aging against some release agents, and it is considered an important performance property. The adhesions to steel of the above aged tapes are measured using method PSTC-1 to further illustrate the stability of this tape as follows:

| Aging conditions | Adhesion to steel (ounces per inch) after aging for period of— | | | | | |
|---|---|---|---|---|---|---|
| | 1 Wk. | 2 Wks. | 3 Wks. | 1 Mth. | 2 Mths. | 3 Mths. |
| 70° F., 50% R.H. | 29 | | 30 | 27 | 29 | 23 |
| 100° F., 10% R.H. | 27 | | 30 | 28 | 24 | 26 |
| 120° F., 10% R.H. | 26 | | 27 | 27 | 22 | 22 |
| 150° F., 35% R.H. | 27 | 20 | 25 | | | |

Again, the performance of this tape in masking for spray painting is excellent in all respects, both initially and after several months aging at ambient room temperature.

EXAMPLE XIV

Pressure-sensitive adhesive tape is prepared as in Examples XII and XIII but using the following adhesive:

| Constituent: | Parts by weight |
|---|---|
| Pale crepe natural rubber | 100 |
| Zinc oxide | 50 |
| 2,5-di-tertiary amyl hydroquinone | 1.5 |
| Di-tert-butyl-p-cresol | 1.5 |
| Zinc dibutyl dithiocarbamate | 1.5 |
| Stikvel P resin solids | 200 |
| Zinc resinate | 10 |
| Oil soluble heat hardening phenol formaldehyde | 25 |

Stikvel P resin is an elastic hydrocarbon resin supplied by Velsicol Chemical Co. as an 80 percent solids solution in toluene.

This adhesive is coated from solution in toluene, dried, and cured at 325° F. for 20 seconds.

The resulting tape possesses the following unwind and quickstick properties after aging under the conditions and for the periods indicated:

| Aging conditions | Unwind adhesion after aging— | | | Quickstick after aging— | | |
|---|---|---|---|---|---|---|
| | 1 Wk. | 2 Wks. | 3 Wks. | 1 Wk. | 2 Wks. | 3 Wks. |
| 70° F., 50% R.H. | 17 | | 15 | 6.0 | | 5.4 |
| 100° F., 10% R.H. | 21 | | 27 | 5.2 | | 7.5 |
| 120° F., 10% R.H. | 26 | | 30 | 5.4 | | 12 |
| 150° F., 35% R.H. | 29 | 27 | | 15 | 20 | |

The performance of this tape in masking for spray painting is excellent.

EXAMPLE XV

Tapes are prepared using the backing of Example VIII and the adhesive of Example XIV. A series of backsizes are used consisting of 100 parts combined alkyd resin solids and melamine-formaldehyde resin solids using the alkyd resin and melamine-formaldehyde resin of Example VIII, 1 part of the alkyl acid phosphate of Example VIII, and 5 parts of the release agent solids of Example XII. In this series, the ratio of alkyd resin solids to melamine-formaldehyde resin solids is varied as shown below. All backsizes are coated from 29.4 percent solids solutions in toluene to give dry coating weights of approximately 0.3 ounce per square yard.

| Tape sample | A | B | C | D | E | F |
|---|---|---|---|---|---|---|
| Alkyd resin | 25 | 40 | 50 | 70 | 75 | 90 |
| Melamine-formaldehyde resin | 75 | 60 | 50 | 30 | 25 | 10 |
| Unwind adhesion, initial | 30 | 24 | 20 | 27 | 17 | 23 |
| Unwind adhesion, 1 wk. 120° F | 58 | 37 | 28 | 30 | 28 | 30 |
| Unwind adhesion, 1 wk. 150° F | 49 | 51 | 40 | 38 | 47 | 43 |

All of these tapes give excellent performance in masking for spray painting.

Tapes also are prepared using the backing and adhesive of Example XII, but substituting a urea-formaldehyde resin in place of the melamine-formaldehyde resin in the backsize. The urea-formaldehyde resin is UF200E, a butylated resin at 50 percent solids in xylene-butanol, obtained from Rohm & Haas Co.; and is used in the proportions shown in the following tape, with 2.5 parts of the alkyl acid phosphate of Example VIII and 5 or 10 parts of the release agent solids of Example XII for every 100 parts of combined alkyd resin solids and formaldehyde resin solids. The alkyd resin is the same as in the previous examples.

| Tape sample | G | H | I | J | K |
|---|---|---|---|---|---|
| Alkyd resin solids | 75 | 75 | 65 | 55 | 65 |
| Melamine formaldehyde resin solids | 25 | | | | |
| Urea-formaldehyde resin solids | | 25 | 35 | 45 | 35 |
| Release agent solids | 10 | 10 | 10 | 10 | 5 |
| Unwind adhesion, initial | 7 | 6 | 7 | 8 | 9 |
| Unwind adhesion, 1 wk. 120° F | 11 | 11 | 16 | 13 | 16 |
| Unwind adhesion, 1 wk. 150° F | 18 | 14 | 20 | 20 | 25 |

All of these tapes perform well in spray paint masking.

To illustrate the insensitivity of tapes of this invention to the amount of release agent in the release coating and the degree of cure of the backsize, a series of release coating compositions is prepared using 75 parts of the alkyd resin solids of Example VIII, 25 parts of the melamine resin solids of Example VIII, 2.5 parts of the alkyl phosphate of Example VIII and varying amounts of the release agent solids of Example XII, as shown in the following table. The release coating compositions are coated from a toluene solution at 30 percent solids on the backing of Example VIII, dried, and then cured for either 10 seconds or 20 seconds at 325° F. The weight of dry release coating used is approximately 0.3 ounce per square yard. The adhesive of Example IX is coated on the side opposite the release coat at a weight of 1.9 ounces per square yard.

| | Tape sample | | | |
|---|---|---|---|---|
| | L | M | N | O |
| | 1 part release agent | 2 parts release agent | 4 parts release agent | 6 parts release agent |
| 10 sec. cure, Unwind adhesion, initial | 22 | 20 | 22 | |
| 10 sec. cure, Unwind adhesion, 1 wk. 120° F | 40 | 38 | 55 | 43 |
| 10 sec. cure, Unwind adhesion, 1 wk. 150° F | 50 | 49 | 57 | 51 |
| 10 sec. cure, Quickstick, initial | 1.9 | 1.8 | 1.6 | 1.3 |
| 10 sec. cure, Quickstick, 1 wk. 120° F | 1.3 | 1.4 | 1.0 | 1.3 |
| 10 sec. cure, Quickstick, 1 wk. 150° F | 2.4 | 2.9 | 2.1 | 1.7 |
| 20 sec. cure, Unwind adhesion, initial | 21 | 19 | 20 | 28 |
| 20 sec. cure Unwind adhesion, 1 wk. 120° F | 36 | 37 | 33 | 45 |
| 20 sec. cure, Unwind adhesion, 1 wk. 150° F | 45 | 49 | 44 | 55 |
| 20 sec. cure, Quickstick, initial | 1.8 | 1.9 | 1.2 | 1.4 |
| 20 sec. cure, Quickstick, 1 wk. 120° F | 1.6 | 1.7 | 1.6 | 1.4 |
| 20 sec. cure, Quickstick, 1 wk. 150° F | 2.6 | 2.3 | 1.9 | 1.9 |

All of Tapes A through O perform well in masking applications for spray painting.

EXAMPLE XVI

The saturated and cured backing made as described in Example XI is used in this example. Two backsizing compositions are prepared using a vinyl plastisol of the following composition in percent by weight: Vinylite QYNV, 60 percent; Paraplex G50, 14.4 percent; Tricresyl phosphate, 21.6 percent; Epon 828, 2 percent; Dibutyl tin maleate, 2 percent. Vinylite QYNV is a high molecular weight dispersion grade polyvinyl chloride made and sold by Union Carbide Plastics Company. Paraplex G50 is a low molecular weight linear liquid polyester plasticizer, molecular weight 2200, viscosity 23 poises, made and sold by Rohm and Haas Company. Epon 828 is a liquid epoxy resin used as a vinyl stabilizer, prepared by reacting epichlorhydrin with 2,2-di (4-hydroxy phenyl) propane, and having an epoxide equivalent weight of approximately 187 and a viscosity of approximately 130 poises at 25° C., made and sold by the Plastics and Resins Division, Shell Chemical Corporation. A backsizing composition illustrating the practice of this invention is prepared as follows: vinyl plastisol 100 grams, release agent solution of Example XII 10 grams of 25.2 percent solids solution, toluene 110 grams. A control backsizing composition not including release agent is prepared as follows: vinyl plastisol 100 grams, toluene 120 grams.

These two backsize compositions are coated on the backing using a Meier rod to give 0.3 oz./yd.$^2$ dry coating weight and, after evaporation of solvent at room temperature, the backsized backings are heated one minute at 400° F. to flux the plastisol. The backsized backings then are coated with the adhesive of Example XIII using the same conditions as in that example. Unwind adhesion and quickstick are determined on the tapes after aging as previously described, obtaining the following results:

| Backsize | Unwind Adhesion (oz./in.) | | | Quickstick | | |
|---|---|---|---|---|---|---|
| | Un-aged | 1 Wk. 120° F. | 1 Wk. 150° F. | Un-aged | 1 Wk. 120° F. | 1 Wk. 150° F. |
| Without release agent | 68 | 90 | 97 | 19 | 13 | 25 |
| With release agent | 11 | 26 | 68 | 13 | 16 | 23 |

Obviously, the very small proportion of release agent included in this vinyl plastisol backsizing composition is very effective in reducing the unwind adhesion of tape rolls, without adverse effect on the adhesive in contact with the backsize. Although this type of thermoplastic composition shows some loss of effectiveness on aging at 150° F., it is excellent at lower aging temperatures. The performance of the tape made with release agent in the backsize is excellent as a working tape for spray painting. The tape without release agent cannot be unwound without considerable distortion of the backing and, because of this, its performance in masking is definitely inferior.

EXAMPLE XVII

Backing, adhesive and release agent for this example are all identical with those of previous Example XVI. However, different film formers are used in combination with the release agent to form backsizing compositions.

A 15 percent solids solution of Zerlon 150 in a 50–50 mixture of methyl ethyl ketone and toluene is prepared, coated on the backing, and dried at room temperature to remove solvent. A second coat is then applied over the first coat, dried at room temperature, and finally heated one minute at 350° F. The total dry weight of the two coats is approximately .35 oz./yd.$^2$. Tape is then prepared from this backsized backing as described, and tested with results as detailed below.

Another backsized backing is prepared in the same way and made into tape and tested, with the exception that release agent is included in the second backsizing coat. The release agent is diluted to 15 percent solids with toluene and mixed with the Zerlon solution to give the proportion of 100 parts Zerlon solids to 50 parts release agent solids.

Similar tapes are made using Vinylite VMCH in place of the Zerlon. Two other tapes are made using Bakelite T–24–9 in place of the Zerlon, the solvent in this case being entirely toluene, and the ratio of T–24–9 solids to release agent solids being 100 to 5.5. Two other tapes are made using polyethylene in place of Zerlon, the solvent in this case being toluene with the solution warmed to 80° C. before coating and the Meier rod also being warmed for coating.

Zerlon 150 is a copolymer of styrene and methyl methacrylate made and sold by Dow Chemical Company, Plastics Department, in the form of crystal clear granules. It has a specific gravity of 1.14, a heat distortion temperature of 205° F., a tensile strength of 9000 p.s.i., and a tensile modulus of 470,000 p.s.i. Vinylite VMCH is a terpolymer of 86 percent vinyl chloride, 13 percent vinyl acetate and 1 percent maleic anhydride, having an intrinsic viscosity of 0.53 determined in cyclohexanone at 20° C., and a specific gravity of 1.35, made and sold by Union Carbide Plastics Company. Bakelite T–24–9 is a solution at 24 percent solids in toluene of a copolymer of 91 percent vinyl acetate to 9 percent vinyl alcohol, made and sold by Union Carbide Plastics Company.

| Film former | Parts release agent per 100 parts film former in BS | Unwind adhesion (oz./in.) | | | Quickstick | | |
|---|---|---|---|---|---|---|---|
| | top coat | Unaged | Aged 1 Wk. 120° F. | Aged 1 Wk. 150° F. | Unaged | Aged 1 Wk. 120° F. | Aged 1 Wk. 150° F. |
| Zerlon | 0 | 48 | 60 | 80 | 7.7 | 2.1 | |
| Do | 50 | 8 | 24 | 46 | 13.3 | 7.3 | 2.5 |
| VMCH | 0 | 55 | 77 | 93 | 7.4 | 9.7 | 9.5 |
| VMCH | 50 | 5 | 16 | 44 | 5.7 | 5.6 | 1.8 |
| T–24–9 | 0 | 62 | 74 | 99 | 5.7 | | 8.6 |
| T–24–9 | 5.5 | 8 | 21 | 40 | 9.7 | 7.5 | 4.3 |
| Polyethylene | 0 | 88 | 88 | 111 | 1.3 | 6.3 | 5.5 |
| Do | 50 | 33 | 33 | 71 | 6.1 | 6.2 | 4.8 |

In every case, the tapes including release agent give satisfactory performance in paint masking, while those without release agent do not.

EXAMPLE XVIII

Tapes are prepared using the saturated backing, release agent and adhesive of Example XVI, but with different film formers used with the release agent to form backsizing compositions.

A backsize composition is prepared from Vitel 207, a polyester film former manufactured by Goodyear Tire and Rubber Co., which is believed to be a polymeric mixture or copolymer of polypropylene and glycerol terephthalate and polypropylene and glycerol sebacate. This includes the following constituents in the proportions indicated: Vitel 207, 100 parts; release agent, 60 parts of 25.2 percent solids solution in toluene; methyl ethyl ketone, 150 parts; toluene, 150 parts. This is coated and air dried to give a dry weight of coating of 0.3 oz./yd.$^2$, then heated 30 seconds at 350° F.

Another backsize composition is prepared using an emulsion terpolymer of 30 parts styrene, 67 parts vinyl acetate, 3 percent methacrylic acid, at 50 percent solids in water, adjusted to pH 9 with ammonium hydroxide. To 200 parts of this emulsion is added 10 parts of a 60 percent solids solution in water of a heat reactive phenol-formaldehyde resin, and 40 parts of the 25.2 percent solids release agent solution of Example XII is added gradually with rapid stirring to emulsify the release agent solution. The stable emulsion so obtained is diluted to 35 percent solids with water, coated and dried, and heated 30 seconds at 350° F.

Tapes made from these backsized backings and tested after aging give the following results:

| | Unwind adhesion | | | Quickstick | | |
|---|---|---|---|---|---|---|
| | Un-aged | 1 Wk. 120° F. | 1 Wk. 150° F. | Un-aged | 1 Wk. 120° F. | 1 Wk. 150° F. |
| Polyester backsize | 13 | 24 | 47 | 12 | 15 | 21 |
| Styrene-acrylate backsize | 8 | 29 | 51 | 13 | 14 | 19 |

EXAMPLE XIX

Four backsizes are prepared as follows:

(1) Vinylite VMCH, 20 parts; release agent of Example XII, 100 parts solids; methyl ethyl ketone, 40 parts; toluene to make 1000 parts total.

(2) Vitel 207, 90 parts; release agent of Example XII, 10 parts solids; methyl ethyl ketone, 1000 parts; toluene to make 1200 parts total.

(3) Dupont VR–1000, 25 parts solids; release agent of Example XII, 75 parts solids; toluene to make 2500 parts total. Dupont VR–1000 is a 15.3 percent solids solution in perchlorethylene of a polymer believed to be a terpolymer of primarily ethylene and vinyl acetate plus a third monomer such as acrylyl chloride which provides acid chloride groups in the finished polymer, making the polymer reactive with active hydrogen-containing substrates and thereby improving its bond to such substrates. It is made by the Plastics Department of E. I. du Pont de Nemours.

(4) Dupont VR–1000, 75 parts solids; release agent of Example XII, 25 parts solids; toluene to make 2500 parts total.

Backsize (1) is coated by Meier rod on a regenerated cellulose film plasticized with 15 percent polyethylene glycol and air dried to give a dry coating weight of 0.005 ounce per square yard. Backsize (2) is coated on 2 mil oriented polyester film at a dry coating weight of 0.015 ounce per square yard, air dried to remove solvent and then heated 30 seconds at 320° F. Backsizes (3) and (4) are coated on both regenerated cellulose films and on 1.5 mil polyethylene film to give dry coating weights of 0.005 ounce per square yard, drying 5 minutes at 70° C. to remove solvent.

A primer coat is spread on the opposite face of the backsized backings at a dry coating weight of 0.02 ounce per square yard and dried. The adhesive of Example XI is then coated over the primed surfaces and dried to give a dry coating weight of 0.75 ounce per square yard. The tapes are slit into narrow widths, wound on cores and aged, and then tested with the following results.

|  |  | Unwind adhesion | | | Quickstick | | |
|---|---|---|---|---|---|---|---|
| Backing | Backsize | Unaged | Aged 1 Wk. 120° F. | Aged 1 Wk. 150° F. | Unaged | Aged 1 Wk. 120° F. | Aged 1 Wk. 150° F. |
| Cellulose | 1 | 6 | 12 | 24 | 11 | 12 | 19 |
| Do | None | 76 | 75 | 89 | 7 | 10 | 19 |
| Polyester | 2 | 8 | 13 | 22 | 10 | 13 | 15 |
| Do | None | 56 | 67 | 87 | 10 | 12 | 16 |
| Cellulose | 3 | 7 | 12 | 7 | 7 | 5 | 3 |
| Do | 4 | 11 | 22 | 25 | 8 | 12 | 8 |
| Polyethylene | 3 | 36 | 37 | 30 | 8 | 7 | 9 |
| Do | 4 | 30 | 40 | 33 | 5 | 7 | 3 |
| Do | None | 50 | 70 | 90 | 8 | 7 | 9 |

All of the above backsized tapes give easy release as indicated and are excellent for office uses requiring clarity and transparency. The unwind adhesion of the unbacksized tapes is too hard for easy dispensing.

There are a great variety of materials which may be used for the flexible backing sheet of the products of this invention. These include substantially nonporous films of materials such as cellulose acetate, regenerated cellulose, polyethylene, polypropylene, vinyls, polyesters such as polyethylene terephthalate, and the like. Various fibrous sheet materials also may be used to provide porous paper backing sheets in accordance with this invention. These include creped kraft paper sheets, flat rope papers, nonwoven fabrics, woven fabrics and cloths, and the like. As indicated hereinbefore, these normally porous fibrous backings also may be precoated to provide a thin flexible nonporous backing sheet according to this invention.

Having now described the invention in specific detail and exemplified the manner in which it may be carried into practice, it will be readily apparent to those skilled in the art that innumerable variations, applications, modifications, and extensions of the basic principles involved may be made without departing from its spirit or scope.

What is claimed is:

1. A release sheet adapted to enter into intimate protective contact with a normally tacky and pressure-sensitive adhesive layer, which comprises a flexible backing sheet having one of its major surfaces coated with a release coating composition adapted to provide uniform and easy release from said adhesive layer and comprising, as the major release ingredient, a release agent copolymer consisting essentially of stearyl methacrylate and acrylonitrile in proportions ranging from about 50 parts by weight of stearyl methacrylate and 50 parts by weight of acrylonitrile to about 80 parts by weight of stearyl methacrylate and 20 parts by weight of acrylonitrile.

2. A release sheet according to claim 1, wherein the proportions of stearyl methacrylate and acrylonitrile range from about 50 parts by weight of stearyl methacrylate and 50 parts by weight of acrylonitrile to about 60 parts by weight of stearyl methacrylate and 40 parts by weight of acrylonitrile.

3. A release sheet according to claim 1, wherein the backing sheet is thin and substantially nonporous, the release coating composition consists predominantly of said release agent copolymer, and the resulting release coating weighs from about 0.001 to about 0.02 ounce per square yard on a dry basis.

4. A release sheet according to claim 1, wherein said sheet is in the form of a pressure-sensitive adhesive tape and said normally tacky and pressure-sensitive adhesive layer is coated onto the surface of said backing sheet opposite to that coated with the release coating composition.

5. A release sheet according to claim 1, wherein said release coating composition also comprises a film forming composition.

6. A release sheet according to claim 5, wherein a major proportion of the release coating composition is the film forming composition, and said film forming composition is incompatible with said copolymer in the dry state of said release coating composition but sufficiently compatible therewith in solution to allow the release coating composition to be coated on the backing without gross separation of the copolymer from the film forming composition during coating.

7. A release sheet according to claim 6, wherein said film forming composition consists predominantly of a soluble polyester.

8. A release sheet according to claim 6, wherein said film forming composition consists predominantly of a soluble polyacrylate.

9. A release sheet according to claim 6, wherein said film forming composition consists predominantly of a hydroxyl modified polyvinyl acetate.

10. A release sheet according to claim 6, wherein said film forming composition consists predominantly of a polyvinyl chloride plastisol.

11. A release sheet according to claim 6, wherein said release agent copolymer possesses a low molecular weight.

12. A release sheet according to claim 11, wherein said release agent copolymer has a methanol insoluble fraction possessing a number average molecular weight of between about 1,000 and 25,000.

13. A release sheet according to claim 12, wherein said backing sheet is a porous fibrous member.

14. A release sheet according to claim 13, wherein said release coating composition comprises at least about 1 percent by weight of said release agent copolymer on a dry basis.

15. A release sheet according to claim 14, wherein the methanol insoluble fraction of said copolymer possesses a number average molecular weight between about 2,000 and 12,000.

16. A release sheet according to claim 13, wherein said release coating composition layer weighs from about 0.05 to about 1.0 ounce per square yard on a dry basis.

17. A release sheet according to claim 16, wherein said release coating composition comprises from about 1 to about 25 percent of said release agent copolymer on a dry basis.

18. A release sheet according to claim 13, wherein said film forming composition comprises an alkyd resin and a formaldehyde resin condensate curing component.

19. A release sheet according to claim 18, wherein said film forming composition comprises from about 90 percent by weight of alkyd resin and 10 percent by weight of curing component to about 50 percent by weight of alkyd resin and 50 percent by weight of curing component.

20. A release sheet according to claim 18, wherein said release coating composition layer weighs from about 0.05 to about 1.0 ounce per square yard on a dry basis, and said release coating composition comprises at least about 1 percent by weight of said release agent copolymer.

21. A release sheet according to claim 15, wherein said film forming composition comprises an alkyd resin and a formaldehyde resin condensate curing component.

22. A release sheet according to claim 13, wherein said sheet is in the form of a pressure-sensitive adhesive tape and said normally tacky and pressure-sensitive adhesive layer is coated onto the surface of said backing sheet opposite to that coated with the release coating composition.

References Cited

UNITED STATES PATENTS

| | | | |
|---|---|---|---|
| 2,607,711 | 8/1952 | Hendricks | 117—122 |
| 2,782,976 | 2/1957 | Rinaldi et al. | 229—3.5 |
| 2,880,862 | 4/1959 | Sermattei | 206—59 |
| 2,913,355 | 11/1959 | Collins | 117—68.5 |
| 2,914,167 | 11/1959 | Holtz | 206—59 |
| 3,052,566 | 9/1962 | Smith | 117—68.5 |
| 3,197,330 | 7/1965 | Bartell | 117—122 |

U.S. Cl. X.R.

177—68, 76, 122, 161; 161—406; 260—85.5